United States Patent
Furuta

(10) Patent No.: US 6,410,883 B1
(45) Date of Patent: Jun. 25, 2002

(54) CLEANING DEVICE AND METHOD FOR CLEANING RESIN SEALING METAL MOLD

(75) Inventor: Ichiro Furuta, Kumamoto (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/574,053

(22) Filed: May 18, 2000

(30) Foreign Application Priority Data

May 26, 1999 (JP) ............................................. 11-145961

(51) Int. Cl.$^7$ ............................................... B23K 26/00
(52) U.S. Cl. ........................... 219/121.68; 219/121.67; 219/121.6; 219/121.74
(58) Field of Search ....................... 219/121.68, 121.67, 219/121.6, 121.74; 428/129, 138

(56) References Cited

U.S. PATENT DOCUMENTS

| | | | | |
|---|---|---|---|---|
| 4,879,082 A | * | 11/1989 | Kudo et al. | 264/106 |
| 5,686,026 A | * | 11/1997 | Ebina | 264/1.33 |
| 6,117,513 A | * | 9/2000 | Hotta et al. | 428/67 |

FOREIGN PATENT DOCUMENTS

| | | | | |
|---|---|---|---|---|
| JP | 57-20437 | * | 2/1982 | ............ H01L/21/56 |
| JP | 62-274734 | * | 11/1987 | ............ H01L/21/56 |
| JP | 1-122417 | | 5/1989 | |
| JP | 8-20037 | * | 1/1996 | ............ B26C/45/14 |
| JP | 8-39270 | * | 2/1996 | ............ B23K/26/00 |
| JP | 10-255510 | | 9/1998 | |

* cited by examiner

*Primary Examiner*—M. Alexandra Elve
(74) *Attorney, Agent, or Firm*—Hutchins, Wheeler & Dittmar

(57) ABSTRACT

A cleaning device and a cleaning method for cleaning a resin sealing metal mold effective for removing complex stains on the metal mold in a short time, the stains containing organic and inorganic substances. The cleaning device decomposes stains on the inner part of the metal mold by irradiating the stains with a laser beam. The cleaning device comprises a laser beam generating means, a first reflection means for reflecting the laser beam generated by the laser beam generating means, and a second reflection means for receiving the reflected laser beam from the first reflection means in order to irradiate the inner part of the metal mold.

7 Claims, 4 Drawing Sheets

F I G. 4
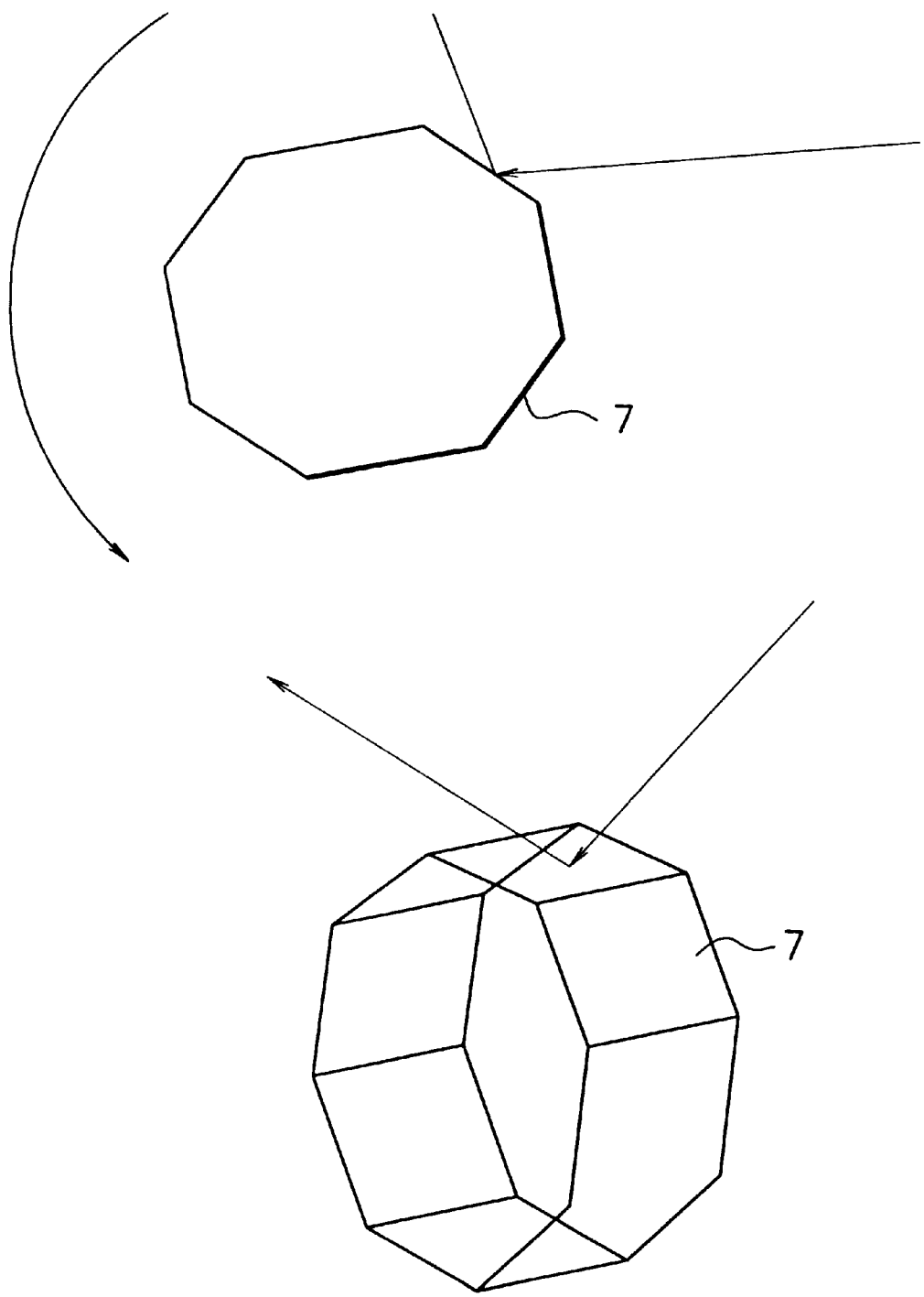

CLEANING DEVICE AND METHOD FOR CLEANING RESIN SEALING METAL MOLD

BACKGROUND OF THE INVENTION

The present invention relates to a cleaning device and a cleaning method for cleaning a resin sealing metal mold, and in particular to a cleaning device for removing stains from a resin sealing metal mold using laser beams, and a cleaning method using this cleaning device.

DESCRIPTION OF THE RELATED ART

Resin sealing metal molds are usually used in manufacturing certain products by sealing IC, LSI, etc. with resin. The resin sealing metal molds need to be cleaned after being used in manufacturing certain number of products. Such cleaning is significant especially when the number of products is large, when the product appearances, etc. should be improved, and when the product's weatherbility should be maintained and improved.

Conventionally, cleaning a resin sealing metal mold would usually require cleaning processes by manpower. Consequently, a great deal of labor and hours for cleaning are needed. Such conditions lead to problems of increasing manhours and deteriorating productivity in a resin sealing process.

Under the circumstances, there has been a great expectation for a progress in a development of a cleaning device and a cleaning method capable of simplifying the cleaning operation of a resin sealing metal mold. It is expected that such device and method will reduce the manhours in the cleaning operation and the time for cleaning, thus realizing improved productivity.

For a prior art example, there is Japanese Patent Application Laid-Open Publication No. 10-255510 disclosing a front floodlight lens for vehicle. In more detail, the disclosure is about a front floodlight lens for vehicle, where a film mainly made of titanium oxide having a photo-medium function is formed. In Table 1 of the disclosure, under the condition that a front floodlight lens having its external surface coated with a film with a photo-medium function goes through irradiation with sunlight for five hours, light transmittance before and after the irradiation is measured to see the difference. Table 1 shows results of measurement of changes in the light transmittance of a deformed lens before and after the irradiation by sunlight, i.e. changes in the light transmittance of the lens before and after stains are decomposed by sunlight, being a light of 500 nm.

Furthermore, in the prior art reference, it is also mentioned that the front floodlight lens for vehicle is capable of photodecomposing stains on the deformed lens by ultraviolet rays to naturally maintain transparency of the lens, because it has the titanium oxide film with the photo-medium function effectively formed on the surface of the deformed lens.

In this way, the prior art reference shows that this deformed lens with a film formed thereon is capable of decomposing and removing stains on the lens, which gives an advantage that the front flood light can be kept in good condition with respect to its appearance and illuminance for a long time. However, such film as disclosed in the reference is effective for partially decomposing and removing stains of organic compounds only.

In the prior art reference, there is no disclosure about removing adhered stains of inorganic substance. Therefore, it should be difficult to completely clean complex stains including organic materials and inorganic substances. For example, a sealing material is a compound of organic materials such as an epoxy resin, etc., and inorganic materials such as a filler of silica, calcium oxide, etc. With respect to removing such complex stains, generally, it is far more difficult than the case of removing stains of organic substances. Likewise, cleaning of complex stains is difficult using the above-described cleaning method alone.

As for another prior art example, there is Japanese Patent Application Laid-Open Publication No. 1-122417 disclosing a cleaning method for cleaning a metal mold for molding synthetic resin. In accordance with this method, it is possible to remove the stains of organic substances and inorganic substances.

In this method, however, if a method as shown in FIG. 3 of the reference is applied, it should take a long time, i.e. three to four hours, for completely removing the entire stains. Moreover, the time required for cleaning depends on a size and a degree of dirtiness of the metal mold, due to which improvement of productivity can not be expected.

The present invention has been achieved with the above aspects of the prior art in mind. In a resin used for a resin sealing, a variety of organic substances and inorganic substances are mixed, and therefore, the resin forming materials including a mixture of organic and inorganic substances tend to adhere to the surface of a metal mold for forming the resin sealing, every time the resin sealing is formed. This will result in an accumulation of stains.

In accordance with the above-described prior art methods, for instance, removing of stains is done using a photodecomposition effect of ultraviolet rays, which limits the decomposing subjects to organic substances.

Consequently, stains of inorganic substances are not decomposed but left accumulated inside the metal mold. It is therefore, unlikely to have the metal mold completely cleaned up inside. Furthermore, with respect to a sealing material made of a complex compound of organic and inorganic substances, cleaning effect will further decrease, which makes it more difficult to remove the stains.

SUMMARY OF THE INVENTION

It is therefore, an object of the present invention to provide a device for cleaning stains on a resin sealing metal mold in a short period of time, even when the stains are complex compounds of organic and inorganic substances, and a method using the device.

In accordance with the first aspect of the present invention, there is provided a cleaning device for cleaning a resin sealing metal mold comprising: a laser beam generating means; a first reflection means for reflecting a laser beam generated by the laser beam generating means; and a second reflection means for receiving the reflected laser beam from the first reflection means in order to irradiate the inner surface of said metal mold.

In accordance with a second aspect of the present invention, there is provided a leaning device for cleaning a resin sealing metal mold as mentioned in the first aspect, further comprising a rotation means for rotating said second reflection means.

In accordance with a third aspect of the present invention, there is provided a cleaning device for cleaning a resin sealing metal mold as mentioned in the first aspect, wherein said laser beam generating means is a pulse form laser generating means which applies the laser beam in pulses.

In accordance with a fourth aspect of the present invention, there is provided a cleaning device for cleaning a resin sealing metal mold as mentioned in the second aspect, wherein said laser beam generating means is a pulse form laser generating means which applies the laser beam in pulses.

In accordance with a fifth aspect of the present invention, there is provided a cleaning system comprising: a cleaning device for cleaning a resin sealing metal mold having a laser beam generating means, a first reflection means for reflecting a laser beam generated by the laser beam generating means, and a second reflection means for receiving the reflected laser beam from the first reflection means in order to irradiate the inner surface of said metal mold; and a resin sealing metal mold having a film with a photo-medium effect formed at least at one portion thereof.

In accordance with a sixth aspect of the present invention, there is provided a cleaning system comprising: a cleaning device for cleaning a resin sealing metal mold having a laser beam generating means, a first reflection means for reflecting a laser beam generated by the laser beam generating means, a second reflection means for receiving the reflected laser beam from the first reflection means in order to irradiate the inner surface of said metal mold, and a rotation means for rotating said second reflection means; and a resin sealing metal mold having a film with a photo-medium effect formed at least at one portion thereof.

In accordance with a seventh aspect of the present invention, there is provided a cleaning system comprising: a cleaning device for cleaning a resin sealing metal mold having a laser beam generating means, a first reflection means for reflecting a laser beam generated by the laser beam generating means, a second reflection means for receiving the reflected laser beam from the first reflection means in order to irradiate the inner surface of said metal mold, and a rotation means for rotating said second reflection means, said laser beam generating means being a pulse form laser beam generating means which applies the laser beam in pulses; and a resin sealing metal mold having a film with a photo-medium effect formed at least at one portion thereof.

In accordance with an eighth aspect of the present invention, there is provided a cleaning method for cleaning a resin sealing metal mold comprising: a laser beam generating step for generating a laser beam; a first reflection step for reflecting a laser beam generated at the laser beam generating step; and a second reflection step for receiving the reflected laser beam reflected at the first reflection step in order to apply the laser beam to irradiate the inner surface of said metal mold.

In accordance with a ninth aspect of the present invention, there is provided a cleaning method for cleaning a resin sealing metal mold as mentioned in the eighth aspect, wherein said metal mold has a film with a photo-medium effect formed at least at one portion thereof.

In accordance with a tenth aspect of the present invention, there is provided a cleaning method for cleaning a resin sealing metal mold comprising: a laser beam generating step for generating a laser beam; a first reflection step for reflecting a laser beam generated at the laser beam generating step; and a second reflection step for receiving the reflected laser beam reflected at the first reflection step in order to apply the laser beam to irradiate the inner surface of said metal mold, the laser beam being applied in pulses to a photo-medium film applied on the inner part of the metal mold in order to remove complex stains on the inner part of the metal mold by photooxidation and thermal decomposition, the stains containing organic and inorganic compounds.

BRIEF DESCRIPTION OF THE DRAWINGS

The above and further objects and the novel feature of the invention will more fully appear from the following detailed description when the same is read in connection with the accompanying drawings, in which:

FIG. 4 is a diagram showing one example of a polygon mirror used in the present invention.

DESCRIPTION OF THE PREFERRED EMBODIMENT

Figure 1:
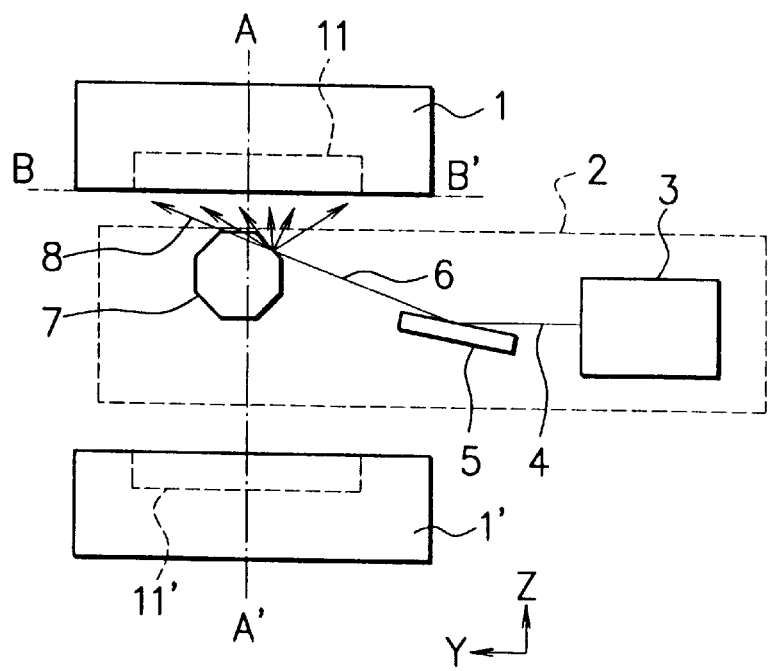
FIG. 1 is side view showing a cleaning device of a resin sealing metal mold of the present invention having a metal mold being set thereto.

Referring now to the drawings, a description of a preferred embodiment of the present invention will be given in detail.

Figure 2:
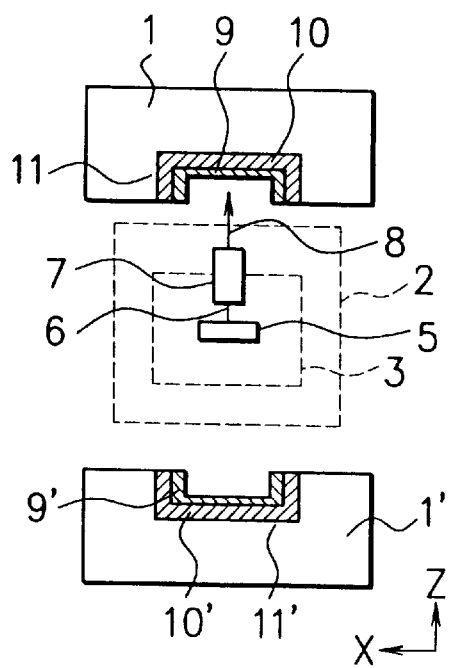
FIG. 2 is a section view taken on line A–A' of FIG. 1.
Figure 3:
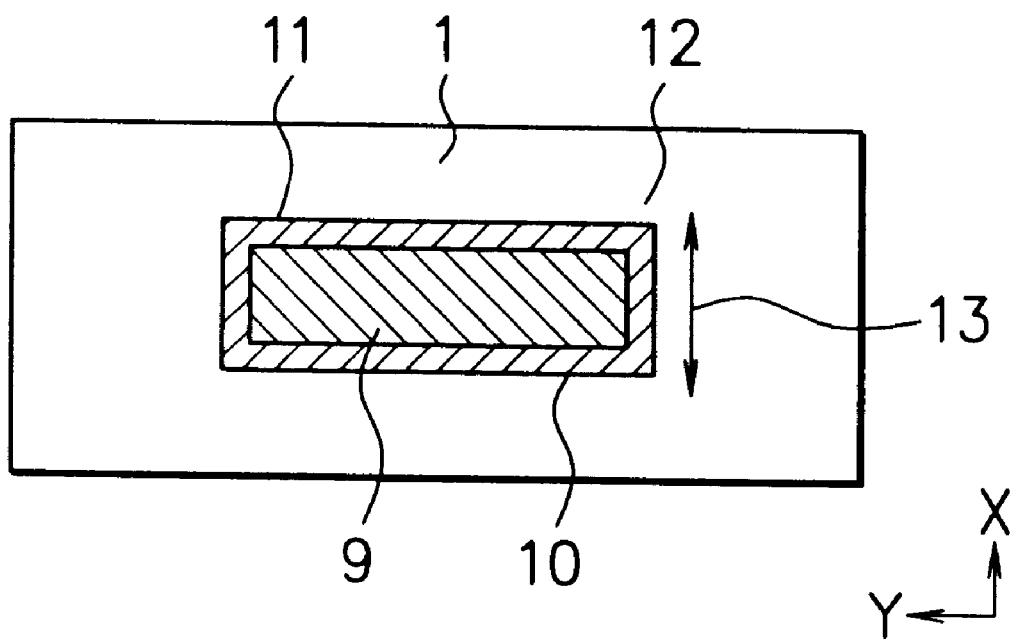
FIG. 3 is a section view taken on line B–B' of FIG. 1.

With reference to FIG. 1 to FIG. 3, an embodiment of a resin sealing metal mold of the present invention will be given. FIG. 1 is a side view of the resin sealing metal mold of the present invention. FIG. 2 is a sectional view taken on line A–A' of FIG. 1, and it shows a section view of the resin sealing metal mold of the present invention. FIG. 3 is a sectional view taken on line B–B' of FIG. 1, and it shows a plan view of the resin sealing metal mold of the present invention.

As illustrated in FIG. 1 and FIG. 2, a resin sealing metal mold cleaning device 2 of the present invention comprises a laser beam oscillation unit 3, a total reflection mirror 5, and a polygon mirror 7. In this case, the total reflection mirror 5 and the polygon mirror 7, etc. can be provided in plural.

As shown in FIG. 4, for instance, the polygon mirror 7 has a polyhedral structure, and each surface of the polyhedron should preferably have a flat surface. For the polyhedral structure, it is not limited to a particular structure, but it should preferably be an octahedral structure. This polygon mirror, for instance, has a single rotation axis, and it is of a structure capable of freely rotating by a rotation means such as a stepping motor, a DC motor, a brushless motor, etc., at a speed of 100 rpm or more.

As shown in FIG. 1, with respect to the resin sealing metal mold cleaning device 2 of the present invention, it is inserted to a space provided in the resin sealing metal mold 1, 1', which is of an open state, where the cleaning operation starts.

Once again, the resin sealing metal mold cleaning device 2 comprises the laser beam oscillation unit 3, the total reflection mirror 5, and the polygon mirror 7. In such resin sealing metal mold cleaning device 2 of the present invention, a laser beam 4 applied by the laser beam oscillation unit 3 is first reflected by the total reflection mirror 5. Next, a laser beam 6 reflected by the total reflection mirror 5 at a predetermined angle is reflected by the polygon mirror 7 rotating at a speed of 100 rpm or more in the above-described manner.

Then with respect to a laser beam 8 reflected by the polygon mirror 7, due to the polygon mirror 7 freely rotating as discussed above, the angle of incidence (angle of reflection) at the polygon mirror 7 is substantially changed as shown in FIG. 4. Consequently, the reflected light takes a form of a sheet 12 evenly irradiating a resin sealing cavity 11. In other words, as shown in FIG. 2, a laser beam entering a certain surface of the polygon mirror 7 at a certain moment is reflected symmetrically with respect to a normal line of the incident light, and this reflected light is to irradiate a certain portion of the inside of the resin sealing cavity 11 as a spot. Then as the polygon mirror starts rotating at the next moment, a new laser beam is reflected to subsequently irradiate a portion different from the portion being irradiated before, due to a change of the normal line formed by a surface of incident and the incident light. Preferably, the reflected light should irradiate a portion in the vicinity of the portion irradiated just before. In this way, due to the rotating polygon mirror, laser beams are applied in series on a line of Y direction shown in FIG. 1.

In the same manner, X direction is fixed while the operation in the Y direction is executed by a laser beam going through multiple reflection at the total reflection mirror and the rotating polygon mirror, by which laser beams are applied to the inside of the cavity 11 in a consecutive manner. Next, as the operation is consecutively executed in the X direction in the same manner, the irradiation light is controlled with respect to both the Y direction and the X direction to enable such irradiation in a form of sheet. In this case, the total reflection mirror and the polygon mirror can be operated by an operation means such as a CPU. In such operation method, data with a mapped information on a degree of dirtiness within the cavity may be previously prepared, so that the data can be referred to in concentrating the irradiation strength on a spot where it is seriously dirty, resulting in requiring shorter period of time for cleaning.

In this way, for the resin sealing metal mold cleaning device 2 of the present invention is capable of moving itself to the X direction (13), it is possible to irradiate the cavity 11 by the laser beams through the whole area. Furthermore, for the total reflection mirror 5 can change its angle, and the polygon mirror can move to Z direction, i.e. in a vertical direction, the entire area of the cavity 11 including the upper, lower, left and right parts of the upper metal mold 1 and the lower metal mold 1' can be irradiated by the laser beam 8.

Although the description has been given about the case of cleaning either the upper metal mold or the lower metal mold, the present invention is not limited to such case only but it is also possible to remove stains on both the upper metal mold and the lower metal mold at the same time. In this case, plural polygon mirrors 7 and total reflection mirrors 5, etc. may be provided. The upper part and the lower part of the metal mold can be irradiated at the same time by aiming a plurality of lights at the polygon mirror by means of using a plurality of total reflection mirrors and half mirrors at front parts of the total reflection mirrors for dividing the laser beam in two, or by means of using a plurality of light sources. Thus, in the present invention, it is possible to freely irradiate the metal mold in the X direction, the Y direction, and the Z direction applying the multiple reflection system using a plurality of members having the reflection function such as the polygon mirrors 7, total reflection mirrors 5, etc. In the present invention, as long as the subject matter of the present invention stays within its limit, it is possible to have a plurality of polygon mirrors 7, total reflection mirrors 5, laser light sources, etc. suitably arranged, and further have optical systems such as half mirrors, lens, etc. suitably added.

Furthermore, the operation of applying the laser beam in a form of sheet can be executed on the basis of an operation program, etc. For instance, in the present invention, data containing the information on seriously dirty parts of each metal mold can be edited in a mapping format to be inputted for making an operation program. Then the cleaning operation can be executed on the basis of this program with mapped information on the stain distribution. The present invention can cope with every type of metal mold having complex shape, and effectively conduct laser beam irradiation for each mold.

Therefore, the resin sealing metal mold cleaning device 2 of the present invention is capable of irradiating every place in the cavity 11 with strong laser beams only requiring a short period of time. Accordingly, strong ultraviolet rays can be applied to the inside of the metal mold for a short period of time, resulting in entirely removing all kinds of stains containing compounds of organic and inorganic substances in a short time.

In the resin sealing metal mold cleaning device of the present invention, it is preferred that the laser beam 4 of YAG FHG (first harmonic generator) laser beam (266 nm), YAG THG (third harmonic generator) laser beam (355 nm), etc. is used as the light source. Especially, in the present invention, the strength of such laser beam normally has an output of about 500 to 2,000 mW, and a spot size of about 0.1 to 0.2 mm$^2$. Furthermore, such laser beam should preferably be applied in pulses, and the pulse cycle should normally be within 100 to 100,000 Hz, more preferably within 500 to 50,000 Hz, or more preferably about 10,000 Hz. The irradiation with such laser beams can be executed over the metal mold by an operation speed of about 60 to 100 mm/sec. A titanium oxide film 10 having a photo-medium function is irradiated with such laser beams.

The titanium oxide film 10 can be made using the known method. For example, the titanium oxide film 10 can be formed by an organic titanium compound such as titanium alkoxide, titanium chelate, titanium acetoxide, formula Ra $TiCl_{3-a}$, etc. (R is a monovalent organic group such as an alkyle group, alkoxyl group, acetoxyl group, etc., and 'a' is an integer 1 or 2. When 'a' is 2, R can be either the same or different), a halide such as $TiX_4$, etc., a inorganic titanium compound such as $TiCl_4$, $Ti(SO_4)_2$, etc. As to a method for producing the titanium oxide film 10 using the above compounds, there are sol-gel process, CVD method, and so on. The CVD method includes for instance, MOCVD method using the above-mentioned organic titanium compounds and inorganic titanium compounds.

As to other methods, a method of sputtering rutile-type or anatase-type titanium oxide, and a method of sputtering metal titanium under oxidation atmosphere are possible.

In another method, a solution of a liquid organic titanium compound dissolved in an organic solvent or a dispersion liquid of the liquid organic titanium compound dispersed in the organic solvent is used for coating, in order to form a film by a hydrolysis of an organic titanium compound or an inorganic titanium compound, or by a precursor of a titanium oxide. After that, an oxidation process, etc. is applied to eventually shape the titanium oxide into a film. In this case, the titanium oxide film 10 being produced can be either a rutile type or an anatase type.

Furthermore, before forming a film on the surface of the metal mold, silicon compound such as a silicone, etc., can be applied, after which a film made of a compound containing a titanium oxide compound using the aforementioned titanium compounds is formed. Preferably, after the compound including the titanium oxidation compound is formed into a film, it should be heated to strengthen its attachment to the metal mold and to improve its photooxidation. In the present invention, although a titanium oxide film having a photo-medium function formed on the surface of the metal mold is used in the preferred embodiment of the invention, any compound having a photo-medium function can be applied to the surface of the metal mold (preferably to the inner surface of the metal mold) as long as the subject matter of the present invention stays unchanged. With respect to such compound, for instance, it is possible to choose one ore more from the following: $SrTiO_3$, $ZnO$, $SnO_2$, $WO_3$, $Fe_2O_3$, $Fe_2O_3$—$FeO$, $Bi_2O_3$, for adding to the above-mentioned photo-medium, and further for forming into a film along with the above-mentioned photo-medium of a titanium oxide.

By irradiating a stain 9 on the titanium oxide film 10 being formed in the above-described manner with a strong laser beam from said light source, the stain 9 can be removed by two kinds of decomposition effects including photodecomposition and thermal decomposition. For instance, the stain 9 can be residual components of the epoxy resin used as the sealing material. Since the epoxy resin is an organic substance, it can be photodecomposed by a strong photo-oxidation effect of the titanium oxide. At the same time, due to an intensive optical energy of the laser beam 4 having a spot area of about 0.1 to 0.2 $mm^2$, and an output of more than 200 mW (e.g. 500 to 2,000 mW), the stain 9 is not only photodecomposed but also going through carbonization, etc. to be thermal-decomposed. The laser light to be used in the present invention should preferably be a pulse type, but it can also be a continuous type.

Figure 5:
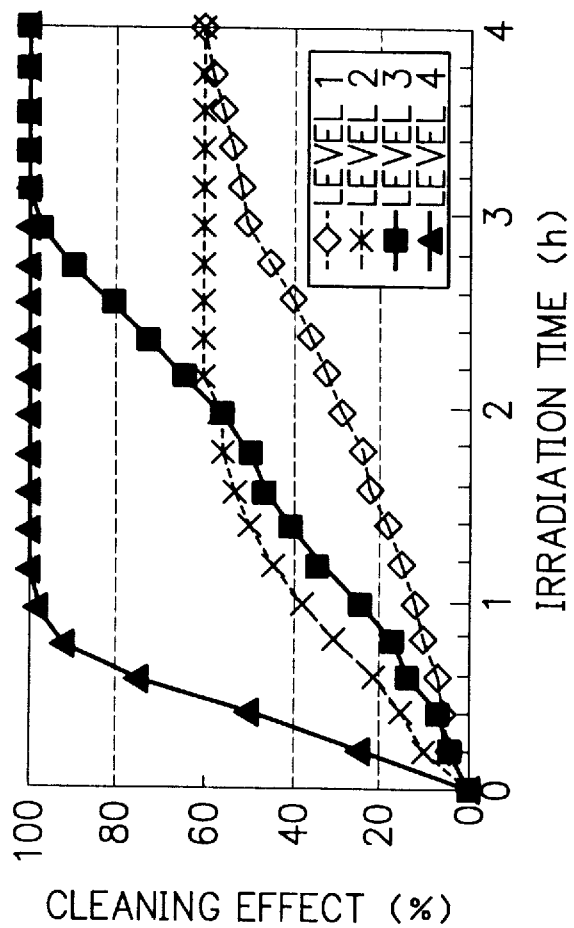
FIG. 5 is a graph showing a relationship between a time for applying light from a light source for irradiation and a cleaning effect under different conditions.

The condition of stains removed by the resin sealing metal mold cleaning device 2 of the present invention is shown in FIG. 5 with other examples of stain removal method for comparison. FIG. 5 is a graph showing cleaning results for different cases under different irradiation conditions.

In FIG. 5, level 1 is an example of a cleaning effect in a case where a low-pressure mercury lamp as a light source is used for applying an ultraviolet ray of 0.355 $\mu$m (355 nm). In using this light source, stains are decomposed mainly by photodecomposition alone.

Level 2 is an example of a cleaning effect in a case where a photo-medium is used along with a low-pressure mercury lamp as a light source for applying an ultraviolet ray of 0.355 $\mu$m (355 nm). In this case, stains are decomposed due to a photodecomposition effect caused by a complex effect of direct photodecomposition by the ultraviolet ray and the use of the photo-medium.

Level 3 is an example of a cleaning effect in a case where a $CO_2$ laser is used as a light source for applying an infrared ray of 10.59 $\mu$m (1059 nm). In using this light source, stains are decomposed mainly due to thermal decomposition alone.

Level 4 is an example of a cleaning effect in a case where a photo-medium is used along with a YAG THG (third harmonic generator) laser for applying an ultraviolet ray of 0.355 $\mu$m (355 nm). In this case, stains are decomposed due to a photodecomposition effect caused by a complex effect of direct photodecomposition by the ultraviolet ray and the use of photo-medium, and a complex effect simultaneously caused by the above complex photodecomposition due to the parallel use of the photo-medium and thermal decomposition by a strong laser beam. In this case, stains are decomposed in a short time, and 100% cleaning effect is exhibited.

In FIG. 5, level 4 corresponds to the cleaning method of the present invention using simultaneous and complex effect of the photodecomposition due to the parallel use of the photo-medium and the thermal decomposition. As compared with other cases where cleaning is effected using the photodecomposition or thermal decomposition alone, level 4 exhibits 100% cleaning effect and it requires only a short time, for about an hour or less, in exhibiting such cleaning effect.

As discussed above, in accordance with the present invention, the resin sealing metal mold cleaning device comprises the laser beam oscillation unit 3, the total reflection mirror 5, and the polygon mirror 7.

In a resin used in the resin sealing, all sorts of organic substances and inorganic substances are combined. Certain products are manufactured by molding such resin sealing resin using a metal mold. The surface of the resin sealing metal mold used in such case is usually subjected to having a resin sealing material including organic and inorganic compounds stick to it at every resin sealing producing process. When such resin sealing material is used with the metal mold for a number of times, residuals of the resin sealing material are accumulated to become complex stains containing organic and inorganic compounds on the inner surface of the metal mold.

In accordance with the present invention, adopting the above-described structure, photodecomposition (photooxidation) effect and thermal decomposition effect are simultaneously caused. Consequently, the present invention is effective in removing not only stains of organic compounds but also stains of inorganic compounds. Furthermore, the present invention is capable of completely removing complex stains from a sealing material in which organic compound and inorganic compound are mixed together.

Furthermore, in accordance with the present invention, intensive ultraviolet laser beam can be used for irradiation in a form of pulse and sheet. Therefore, stain removal by a mechanical effect caused by an impact force, etc. from a strong laser power and pulse irradiation, etc, is added to the stain removal due to the above mentioned effects. Consequently, the present invention is effective in removing not only stains of organic compounds but also stains of inorganic compounds. Furthermore, the present invention is capable of completely removing complex stains from a sealing material in which organic compound and inorganic compound are mixed together. Removing such complex stains is either difficult or requiring a long time with the application of photooxidation or thermal decomposition alone, but the present invention is capable of removing such complex stains in a short time without making any scratches on the metal mold.

Therefore, in accordance with the present invention, even when new stains are formed on the surface of the metal mold, it is possible to easily remove them. Furthermore, no stain will be formed due to scratches on the metal mold, and therefore, the quality of a LSI, etc. will not be affected due to having scratches etc. being formed on the metal mold.

While the preferred embodiments of the invention have been described using specific terms, such description is for illustrative purposes only, and it is to be understood that changes and variations may be made without departing from the spirit or the scope of the following claims.

What is claimed is:
1. A cleaning device for cleaning a resin sealing metal mold comprising:
   a laser beam generating means;
   a first reflection means for reflecting a laser beam generated by the laser beam generating means; and
   a second reflection means for receiving the reflected laser beam from the first reflection means in order to irradiate the inner surface of said metal mold.

2. A cleaning device for cleaning a resin sealing metal mold as claimed in claim 1, further comprising a rotation means for rotating said second reflection means.

3. A cleaning device for cleaning a resin sealing metal mold as claimed in claim 1, wherein said laser beam generating means is a pulse form laser generating means which applies the laser beam in pulses.

4. A cleaning device for cleaning a resin sealing metal mold as claimed in claim 2, wherein said laser beam generating means is a pulse form laser generating means which applies the laser beam in pulses.

5. A cleaning system comprising:
- a cleaning device for cleaning a resin sealing metal mold having a laser beam generating means, a first reflection means for reflecting a laser beam generated by the laser beam generating means, and a second reflection means for receiving the reflected laser beam from the first reflection means in order to irradiate the inner surface of said metal mold; and
- a resin sealing metal mold having a film with a photo-medium effect formed at least at one portion thereof.

6. A cleaning system comprising:
- a cleaning device for cleaning a resin sealing metal mold having a laser beam generating means, a first reflection means for reflecting a laser beam generated by the laser beam generating means, a second reflection means for receiving the reflected laser beam from the first reflection means in order to irradiate the inner surface of said metal mold, and a rotation means for rotating said second reflection means; and
- a resin sealing metal mold having a film with a photo-medium effect formed at least at one portion thereof.

7. A cleaning system comprising:
- a cleaning device for cleaning a resin sealing metal mold having a laser beam generating means, a first reflection means for reflecting a laser beam generated by the laser beam generating means, a second reflection means for receiving the reflected laser beam from the first reflection means in order to irradiate the inner surface of said metal mold, and a rotation means for rotating said second reflection means, said laser beam generating means being a pulse form laser beam generating means which applies the laser beam in pulses; and
- a resin sealing metal mold having a film with a photo-medium effect formed at least at one portion thereof.

* * * * *